United States Patent
Tian

(10) Patent No.: US 10,766,788 B2
(45) Date of Patent: Sep. 8, 2020

(54) WASTE WATER TREATMENT SYSTEM WITH BUFFERING DEVICE AND WASTE WATER TREATMENT METHOD THEREFOR

(71) Applicant: Aquacell INC., Plymouth, MN (US)

(72) Inventor: Xufeng Tian, Beijing (CN)

(73) Assignee: Aquacell INC., Plymouth, MN (US)

( * ) Notice: Subject to any disclaimer, the term of this patent is extended or adjusted under 35 U.S.C. 154(b) by 0 days.

(21) Appl. No.: 16/342,984

(22) PCT Filed: Jun. 29, 2018

(86) PCT No.: PCT/CN2018/093711
§ 371 (c)(1),
(2) Date: Apr. 18, 2019

(87) PCT Pub. No.: WO2019/001571
PCT Pub. Date: Jan. 3, 2019

(65) Prior Publication Data
US 2020/0055747 A1    Feb. 20, 2020

(30) Foreign Application Priority Data
Jun. 29, 2017    (CN) .......................... 2017 1 0517271

(51) Int. Cl.
C02F 1/04    (2006.01)
C02F 1/00    (2006.01)
C02F 1/52    (2006.01)

(52) U.S. Cl.
CPC ............. *C02F 1/048* (2013.01); *C02F 1/008* (2013.01); *C02F 1/52* (2013.01);
(Continued)

(58) Field of Classification Search
CPC ............. C02F 1/008; C02F 1/048; C02F 1/52
See application file for complete search history.

(56) References Cited

U.S. PATENT DOCUMENTS 3,338,970 A * 8/1967 Schmitz ............... B01D 9/0018
564/497
4,180,547 A * 12/1979 Chirico .................. C01B 7/096
423/197

(Continued)

FOREIGN PATENT DOCUMENTS

CN    203959976 U  * 11/2014  ................ C02F 9/10
CN    206872473 U    1/2018

OTHER PUBLICATIONS

Espacenet Translation of CN 203959976 Obtained Mar. 26, 2020. (Year: 2020).*

(Continued)

*Primary Examiner* — Jonathan Miller

(57) ABSTRACT

Disclosed is a waste water treatment system with a buffering device, the system comprising a waste water pretreatment device, an evaporator, a circulating crystallizer, a crystal filtration device and a water removal device which communicate with each other in sequence, and further comprising a primary buffering device and a secondary buffering device, wherein one end of the primary buffering device is in bi-directional communication with the circulating crystallizer, and the other end thereof is connected to the evaporator; and the secondary buffering device is in bi-directional communication with the circulating crystallizer. Further disclosed is a waste water treatment method for a waste water treatment system with a buffering device.

13 Claims, 1 Drawing Sheet

(52) U.S. Cl.
CPC ............... *C02F 2001/5218* (2013.01); *C02F 2209/001* (2013.01); *C02F 2209/01* (2013.01); *C02F 2209/02* (2013.01); *C02F 2209/05* (2013.01); *C02F 2209/06* (2013.01); *C02F 2209/11* (2013.01); *C02F 2209/42* (2013.01); *C02F 2301/046* (2013.01)

(56) References Cited

U.S. PATENT DOCUMENTS

| | | | | |
|---|---|---|---|---|
| 4,392,959 | A * | 7/1983 | Coillet ................. | B01D 61/022 210/638 |
| 7,439,391 | B2 * | 10/2008 | Gallagher ............ | B01D 9/0004 562/580 |
| 7,595,001 | B2 * | 9/2009 | Arakel ................. | B01D 61/025 210/710 |
| 2006/0196836 | A1 * | 9/2006 | Arakel ................. | B01D 61/025 210/723 |
| 2015/0321924 | A1 * | 11/2015 | Wrubel .................... | C02F 1/22 62/532 |

OTHER PUBLICATIONS

International Search Report of PCT Patent Application No. PCT/CN2018/093711 dated Sep. 18, 2018.

* cited by examiner

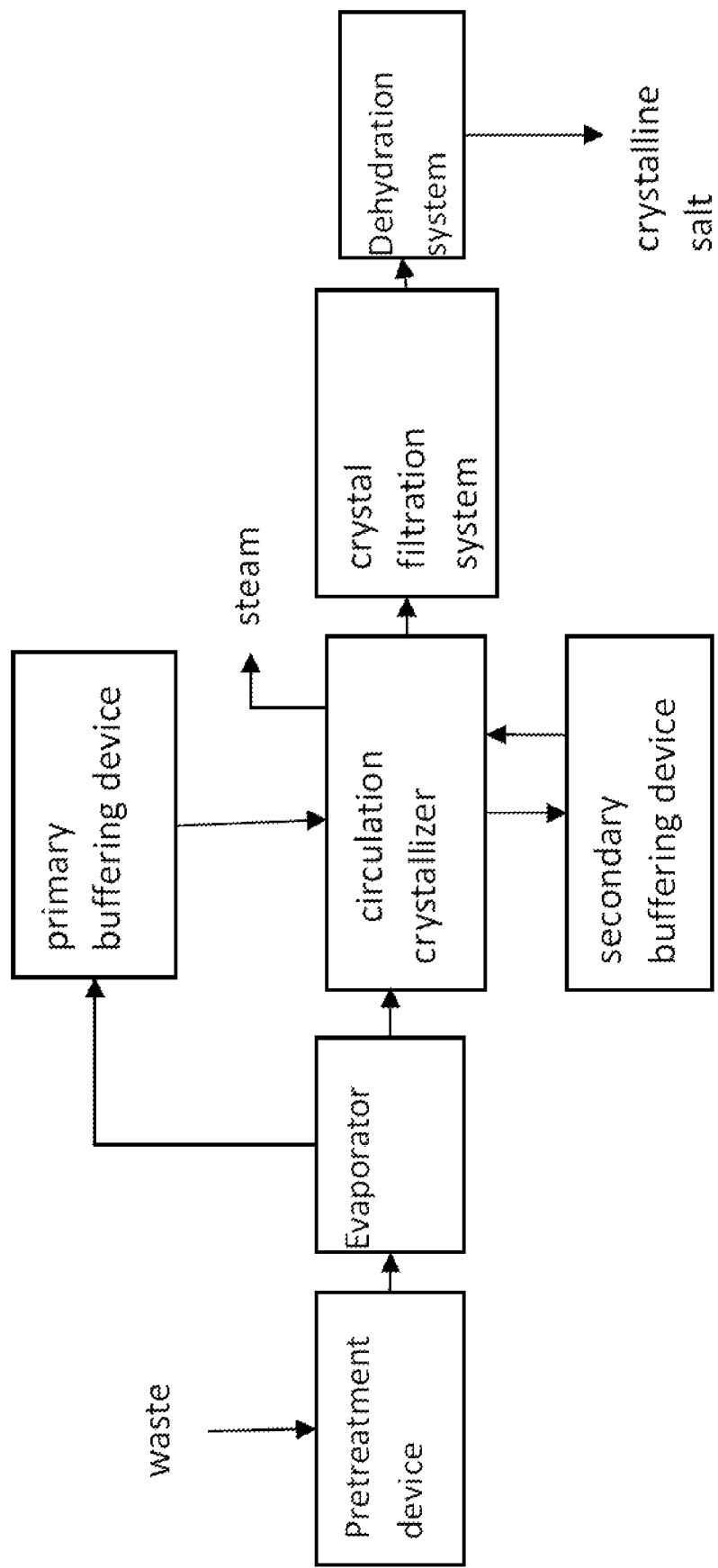

WASTE WATER TREATMENT SYSTEM WITH BUFFERING DEVICE AND WASTE WATER TREATMENT METHOD THEREFOR

FIELD OF THE APPLICATION

The present invention relates to the field of waste water treatment, in particular, to a waste water treatment system with a buffering device and a waste water treatment method therefor.

BACKGROUND OF THE APPLICATION

At present, general-purpose waste water treatment systems include pretreatment subsystems, falling film evaporators, forced circulation crystallizers, crystal filtration subsystems, and centrifugal dehydration subsystems. Among them, it is difficult to precisely define the residence time of the crystal in the crystallizer because the particle size of the crystallizer is not uniform and unstable. In addition, due to the formation of large salt in the crystallizer, plugging often occurs in actual operation, and plugging causes the entire waste water treatment system to have a lower treatment efficiency and higher energy consumption, which is not conducive to energy conservation and emission reduction.

SUMMARY OF THE APPLICATION

The purpose of the present invention is to provide a waste water treatment system with a buffering device and a waste water treatment method thereof in order to solve above problems in prior art.

To achieve the above purpose, the waste water treatment system with a buffering device of the present invention comprises a waste water pretreatment device, an evaporator, a circulation crystallizer, a crystal filtration device, a dehydration device, a primary buffering device and a secondary buffering device; the waste water pretreatment device, the evaporator, the circulation crystallizer, the crystal filtration device, the dehydration device are sequentially communicated; one end of the primary buffering device is in bidirectional communication with the circulation crystallizer and the other end is connected with the evaporator; the secondary buffering device is in bidirectional communication with the circulation crystallizer; both the primary buffering device and the secondary buffering device include a plurality of buffers, of which each is provided with a detection element related to the liquid level, and the circulation crystallizer is provided with a detection element related to the concentration; the system further comprises a controller that is in data communication with the central controller of the system and is also connected to the detection element related to the liquid level and the detection element related to the concentration, respectively.

Preferably, an outlet and an inlet of the circulation crystallizer, a first opening and a second opening of the primary buffering device, an outlet and an inlet of the secondary buffering device, and an inlet and an outlet of each buffer are all provided with a power connection device that controls a fluid flow in the buffering devices with the controller.

Preferably, the detection element related to the liquid level comprises a liquid level sensor, and the detection element related to the concentration is one or more of a density sensor, a conductivity meter, and a turbidity sensor.

Preferably, the main structure of the buffer is a can-shaped structure, and a viewing port is opened on the can-shaped structure and the can-shaped structure is provided with a stirring device.

Preferably, one end of the primary buffering device is in bidirectional communication with the circulation crystallizer and the other end is connected with the evaporator, specifically as follows: the outlet of the evaporator is connected to the first opening of the primary buffering device and a first branch port of the circulation crystallizer is connected to the second opening of the primary buffering device;

the secondary buffering device is in bidirectional communication with the circulation crystallizer, specifically as follows: a second branch port of the circulation crystallizer is also connected to the inlet of the secondary buffering device and the outlet of the secondary buffering device is connected to the inlet of the circulation crystallizer.

The waste water treatment method according to the waste water treatment system with a buffering device of the present invention comprises the steps of:

S1, starting the waste water treatment system other than the primary buffering device and the secondary buffering device and entering S2 when entering the stable evaporation stage;

S2, in the crystallization process of the circulating crystallizer, existing one or more of the following operating conditions:

operating conditions 1: when the characteristic value of the solution in the circulation crystallizer >a predetermined threshold K, the liquid in the primary buffering device is controlled to flow to the circulation crystallizer;

operating conditions 2: when the characteristic value of the solution in the circulation crystallizer <a predetermined threshold K, the liquid in the circulation crystallizer is controlled to flow to the primary buffering device;

operating conditions 3: when the characteristic value of the solution in the circulation crystallizer >a predetermined threshold M, the liquid in the circulation crystallizer is controlled to flow to the secondary buffering device;

operating conditions 4: when the characteristic value of the solution in the circulation crystallizer <a predetermined threshold M, the liquid in the circulation crystallizer is controlled to flow to the secondary buffering device;

S3, opening the outlet of the circulation crystallizer and generating a crystalline salt for precipitating after the condensed liquid enters the crystal filtration device and the dehydration device in sequence when the characteristic value of the solution in the circulation crystallizer reaches a predetermined crystallization threshold.

Preferably, between step S1 and step S2, there is also a step of controlling the liquid in the evaporator to flow to the primary buffering device until the characteristic value of the liquid in the primary buffering device reaches a predetermined low threshold.

More preferably, after operating condition 1, there is also included with a step of controlling the liquid in the evaporator to flow to the primary buffering device until the characteristic value of the liquid in the primary buffering device reaches a predetermined low threshold.

More preferably, in operating condition 2, the liquid in the evaporator flows to the primary buffering device until the total liquid amount for the characteristic value of the liquid in the primary buffering device reaches a predetermined high threshold.

The beneficial effects of the present invention are:

The circulation crystallizer of the device of the present invention is connected to the crystal filtration device, the primary buffering device, and the secondary buffering device, respectively. The liquid in the two buffering devices is transported back to the circulation crystallizer as needed, and then the operation condition of the forced circulation crystallizer is adjusted as needed, thereby reducing the production of large salt in the circulation crystallizer and walling, slowing down the plugging.

The present invention realizes the reduction of the running time proportion of the high-concentration waste water, reduces the plugging of the pipe, and improves the operating efficiency of the device. The waste water treated through the method of the present invention has more fine and uniform crystal nuclei; therefore, the method of the present invention improves the crystallization effect and reduces the energy consumption.

BRIEF DESCRIPTION OF THE DRAWINGS

The FIGURE is a structure view of the waste water treatment system with a buffering device.

DETAILED DESCRIPTION OF THE EXAMPLES

In order that the objectives, technical schemes and advantages of the present invention will become more apparent, the present invention will be described in more detail with reference to the drawings. It should be understood that the specific embodiments described herein are only for illustrating but not for limiting the present invention.

EMBODIMENTS

With reference to the FIGURE, the waste water treatment system with a buffering device of the present embodiment comprises a waste water pretreatment device, an evaporator, a circulation crystallizer, a crystal filtration device, a dehydration device, a primary buffering device and a secondary buffering device; the waste water pretreatment device, the evaporator, the circulation crystallizer, the crystal filtration device, the dehydration device are sequentially communicated; one end of the primary buffering device is in bidirectional communication with the circulation crystallizer and the other end is connected with the evaporator; the secondary buffering device is in bidirectional communication with the circulation crystallizer; both the primary buffering device and the secondary buffering device include a plurality of buffers, of which each is provided with a detection element related to the liquid level, and the circulation crystallizer is provided with a detection element related to the concentration; the system further comprises a controller that is in data communication with the central controller of the system and is also connected to the detection element related to the liquid level and the detection element related to the concentration, respectively.

A more detailed explanation is:

In the present embodiment, an outlet and an inlet of the circulation crystallizer, a first opening and a second opening of the primary buffering device, an outlet and an inlet of the secondary buffering device, and an inlet and an outlet of each buffer are all provided with a power connection device that controls a fluid flow in the buffering devices with the controller. The circulation crystallizer is a forced circulation crystallizer.

In the present embodiment, the detection element related to the liquid level comprises a liquid level sensor, and the detection element related to the concentration is one or more of a density sensor, a conductivity meter, and a turbidity sensor.

In the present embodiment, the buffering device is of any type as long as it can store the waste water discharged from the forced circulation crystallizer. Preferably, the main structure of the buffering device is a can-shaped structure, and a viewing port is opened on the can-shaped structure. Multiple buffers located in the buffering device of same level are connected in parallel.

In the present embodiment, one end of the primary buffering device is in bidirectional communication with the circulation crystallizer and the other end is connected with the evaporator, specifically as follows: the outlet of the evaporator is connected to the first opening of the primary buffering device and a first branch port of the circulation crystallizer is connected to the second opening of the primary buffering device;

the secondary buffering device is in bidirectional communication with the circulation crystallizer, specifically as follows: a second branch port of the circulation crystallizer is also connected to the inlet of the secondary buffering device and the outlet of the secondary buffering device is connected to the inlet of the circulation crystallizer.

Embodiment 2

The waste water treatment method for the waste water treatment system with a buffering device of the present embodiment comprises the steps of:

S1, starting the waste water treatment system other than the primary buffering device and the secondary buffering device and entering S2 when entering the stable evaporation stage;

S2, in the crystallization process of the circulating crystallizer, existing one or more of the following operating conditions:

operating conditions 1: when the characteristic value of the solution in the circulation crystallizer >a predetermined threshold K, the liquid in the primary buffering device is controlled to flow to the circulation crystallizer;

operating conditions 2: when the characteristic value of the solution in the circulation crystallizer <a predetermined threshold K, the liquid in the circulation crystallizer is controlled to flow to the primary buffering device;

operating conditions 3: when the characteristic value of the solution in the circulation crystallizer >a predetermined threshold M, the liquid in the circulation crystallizer is controlled to flow to the secondary buffering device;

operating conditions 4: when the characteristic value of the solution in the circulation crystallizer <a predetermined threshold M, the liquid in the circulation crystallizer is controlled to flow to the secondary buffering device;

S3, opening the outlet of the circulation crystallizer and generating a crystalline salt for precipitating after the condensed liquid enters the crystal filtration device and the dehydration device in sequence when the characteristic value of the solution in the circulation crystallizer reaches a predetermined crystallization threshold.

In the present embodiment, the contamination of the liquid flowing from the circulation crystallizer to the secondary buffering device is more serious than the contamination of the liquid flowing from the circulation crystallizer to the primary buffering device.

A more detailed explanation is:

The detection element related to the liquid level collects and obtains an index related to the liquid level and sends it to the controller, and according to the index related to the liquid level, the controller obtains the liquid level value of the liquid in the buffering device $\alpha$;

the detection element related to the concentration collects and obtains an index related to the concentration and sends it to the controller, and according to the index related to the concentration, the controller obtains the concentration value of the liquid in the circulation crystallizer;

the controller obtains the internal environmental parameters of the waste water treatment system obtained from the central controller at the current calculation time;

based on the liquid level value in the buffering device α and the concentration value of the liquid in the circulation crystallizer, an index of the current calculation time is obtained by combining the environmental parameters.

(3) The detection element related to the liquid level and the detection element related to the concentration obtain the characteristic values related to the liquid level and the concentration respectively according to a preset time interval or an optimized time interval.

In the present embodiment, the detection element can use the densitometer to calculate the density of the waste water to calculate the corresponding concentration, and other existing detection technologies such as a conductivity meter may also be used.

When the primary or secondary buffering device and the circulation crystallizer are not in fluid communication, the solution in the primary or secondary buffering device escapes from the forced circulation crystallizer and enters another cycle of the crystalline state. Since the temperature and pressure of the primary or secondary buffering device are different from those of the forced circulation crystallizer, the mechanism of grain growth is different. The technical engineer in the art chooses to increase the solution storage capacity of the primary or secondary buffering device at night and use the low temperature at night. Although the grain growth speed is slow at that time, it is favorable for the generation of fine and uniform crystal nuclei, for the increase of the crystal effect, and also for the reduction of the energy consumption.

(4) In present embodiment, since the waste water first flows through the circulation crystallizer, and after the concentration empirical value is reached, it is transported to the primary or secondary buffering device for storage, and then transported to the circulation crystallizer for concentration above the concentration empirical value. Therefore, through the system and method described in the present application, during the entire operation cycle of the circulation crystallizer, the proportion of the operation time of the high-concentration liquid in the circulation crystallizer decreases, thereby reducing the blocking of the pipe and improving the operation efficiency of the system.

More detailed examples:

In this application, the waste water evaporation process is roughly divided into three stages: feed preheating, stable evaporation, and parking discharge.

1. Feed preheating: after checking the equipment, the feed pump is started, and when the feed reaches the standard level of predetermined value of the crystallizer separator, the forced circulation pump and the discharge pump are started; when the liquid level of the separator reaches the high level of predetermined value, the feed pump stops automatically and the feed is complete. Then gradually the steam preheat valve, air compressor are started and other operations are performed so that the system enters the normal stable evaporation state.

2. Stable evaporation: when the system is in normally evaporation, the compressor operating frequency is controlled to be about 44-47 Hz, the operating current is 540-570 A, the feeding temperature is 90° C., the separator liquid level is 1400 mm, and the pressure of the forced circulation evaporator is about 1250 bar. After evaporating for a period of time, the crystal particles are observed at the sight glass of the separator leg or through sampling at the sampling port; if there are salt crystal particles, they are discharged in time.

3. Parking discharge: when in normal parking or it is needed to stop the system due to external reasons, first feeding into the system is stopped, then the crystal material is completely output in the salt leg, and finally tap water is introduced to evaporate and clean the equipment according to the evaporation process.

In the present application, the primary buffering device and the secondary buffering device only operate in the stable evaporation stage, so that the circulation crystallizer gets into a fluctuating operating state.

Before the start of the waste water treatment process, two thresholds are set in advance: a threshold α and a threshold β, and each threshold is a set of indexes.

Threshold α {

[circulation crystallizer liquid level: less than 1200 mm, circulation crystallizer conductivity: more than 832 S/m, temperature: 95-970 C, pH value: 8.31, average liquid level of primary buffer tank: more than 500 mm];

[circulation crystallizer liquid level: more than 1200 mm, circulation crystallizer conductivity: less than 1839 S/m, temperature: 89-940 C, pH value: 8.33, average liquid level of primary buffer tank: less than 500 mm];

}

Threshold β {

[circulation crystallizer liquid level: less than 990 mm, circulation crystallizer conductivity: more than 1931 S/m, temperature: 95-970 C, pH value: 8.23, average liquid level of primary buffer tank: more than 570 mm];

[circulation crystallizer liquid level: more than 990 mm, circulation crystallizer conductivity: less than 1339 S/m, temperature: 89-940 C, pH value: 8.03, average liquid level of primary buffer tank: less than 570 mm];

}

As known by those skilled in the art: according to project estimation, the threshold α corresponds to a concentration ratio of 10%, and the threshold β corresponds to a concentration ratio of 30%. In the present application, a primary buffering device and a secondary buffering device are introduced in order to allow the concentration ratio of the circulation crystallizer to fluctuate between the threshold α and the threshold β.

Thus, when the waste water treatment system is running, there are any of the following conditions:

First operating condition: when the characteristic value of the water quality of the circulation crystallizer is smaller than the threshold value α, the waste water from the secondary buffering device is introduced into the circulation crystallizer so that the final characteristic value of the water quality of the circulation crystallizer is greater than the threshold value α. The grains in the waste water that has been left standing by the secondary buffering device are uniform, and the quality of the waste water crystallization of the circulation crystallizer is increased.

Second operating condition: when the characteristic value of the water quality of the circulation crystallizer is larger than the threshold value β, the waste water in the circulation crystallizer is introduced into the secondary buffering device. After a period of time, the waste water from the primary buffering device is again introduced into the circulation crystallizer so that the final characteristic value of the water quality of the circulation crystallizer is smaller than the threshold value α.

Third operating condition: when the characteristic value of the water quality of the circulation crystallizer is between the thresholds α and β, the operation of the buffering device is stopped.

By adopting the above technical solutions disclosed by the present invention, the following beneficial effects are obtained:

The outlet of the circulation crystallizer of the device of the present invention is connected to the crystal filtration device and the buffering devices, respectively. The liquid in the buffering devices is transported back to the circulation crystallizer as needed, and then the operation condition of the forced circulation crystallizer is adjusted as needed, thereby reducing the production of large salt in the circulation crystallizer and walling, slowing down the plugging.

The reduction of the running time proportion of the high-concentration waste water of the device according to the present invention reduces the plugging of the pipe and improves the operating efficiency of the device. The waste water obtained through the method of the present invention has more fine and uniform crystal nuclei; therefore, the method of the present invention improves the crystallization effect and reduces the energy consumption.

The above descriptions are merely preferred implementation manners of the present invention. It should be noted that those skilled in the art may make some improvements and modifications without departing from the principle of the present invention. These improvements and modifications should also be regarded as the scope of protection of this invention.

What is claimed is:

1. A waste water treatment system with a buffering device, comprising a waste water pretreatment device, an evaporator, a circulation crystallizer, a crystal filtration device, a dehydration device, a primary buffering device and a secondary buffering device;
   the waste water pretreatment device, the evaporator, the circulation crystallizer, the crystal filtration device, the dehydration device are sequentially communicated;
   one end of the primary buffering device is in bidirectional communication with the circulation crystallizer and the other end is connected with the evaporator; the secondary buffering device is in bidirectional communication with the circulation crystallizer;
   both the primary buffering device and the secondary buffering device include a plurality of buffers, each of the plurality of buffers is provided with a detection element related to a liquid level, and the circulation crystallizer is provided with a detection element related to a concentration;
   the system further comprises a controller that is in data communication with a central controller of the system and is also connected to each detection element related to the liquid level and the detection element related to the concentration, respectively.

2. The waste water treatment system with a buffering device according to claim 1, wherein an outlet and an inlet of the circulation crystallizer, a first opening and a second opening of the primary buffering device, an outlet and an inlet of the secondary buffering device, and an inlet and an outlet of each buffer are all provided with a power connection device that controls a fluid flow in the buffering devices with the controller.

3. The waste water treatment system with a buffering device according to claim 1, wherein the detection element related to the liquid level comprises a liquid level sensor, and the detection element related to the concentration is one or more of a density sensor, a conductivity meter, and a turbidity sensor.

4. The waste water treatment system with a buffering device according to claim 1, wherein a main structure of the buffer is a can-shaped structure, and a viewing port is opened on the can-shaped structure and the can-shaped structure is provided with a stirring device.

5. The waste water treatment system with a buffering device according to claim 1, wherein one end of the primary buffering device is in bidirectional communication with the circulation crystallizer and the other end is connected with the evaporator, specifically as follows:
   an outlet of the evaporator is connected to a first opening of the primary buffering device and a first branch port of the circulation crystallizer is connected to a second opening of the primary buffering device;
   the secondary buffering device is in bidirectional communication with the circulation crystallizer, specifically as follows:
   a second branch port of the circulation crystallizer is also connected to an inlet of the secondary buffering device and an outlet of the secondary buffering device is connected to an inlet of the circulation crystallizer.

6. A waste water treatment method using the waste water treatment system with a buffering device according to claim 1, comprising the steps of:
   S1, starting the waste water treatment system other than the primary buffering device and the secondary buffering device;
   S2, in a crystallization process of the circulating crystallizer, existing one or more of the following operating conditions, wherein this step is begun when a stable evaporator operation is achieved, and the following operating conditions are maintained via the controller:
   operating condition 1: when a characteristic value of a solution in the circulation crystallizer >a predetermined threshold K, a liquid in the primary buffering device is controlled to flow to the circulation crystallizer;
   operating condition 2: when the characteristic value of the solution in the circulation crystallizer <a predetermined threshold K, the liquid in the circulation crystallizer is controlled to flow to the primary buffering device;
   operating condition 3: when the characteristic value of the solution in the circulation crystallizer >a predetermined threshold M, the liquid in the circulation crystallizer is controlled to flow to the secondary buffering device;
   operating condition 4: when the characteristic value of the solution in the circulation crystallizer <a predetermined threshold M, the liquid in the circulation crystallizer is controlled to flow to the secondary buffering device;
   S3, opening an outlet of the circulation crystallizer and generating a crystalline salt for precipitating after a condensed liquid enters the crystal filtration device and the dehydration device in sequence when the characteristic value of the solution in the circulation crystallizer reaches a predetermined crystallization threshold.

7. The waste water treatment method according to claim 6, wherein between step S1 and step S2, there is also a step of controlling a liquid in the evaporator to flow to the primary buffering device until the characteristic value of the liquid in the primary buffering device reaches a predetermined low threshold.

8. The waste water treatment method according to claim 7, wherein after operating condition 1, there is also included with a step of controlling the liquid in the evaporator to flow to the primary buffering device until the characteristic value of the liquid in the primary buffering device reaches a predetermined low threshold.

9. The waste water treatment method according to claim 7, wherein in operating condition 2, the liquid in the evaporator flows to the primary buffering device until a total liquid amount for the characteristic value of the liquid in the primary buffering device reaches a predetermined high threshold.

10. A waste water treatment method using the waste water treatment system with a buffering device according to claim 2, comprising the steps of:
- S1, starting the waste water treatment system other than the primary buffering device and the secondary buffering device;
- S2, in a crystallization process of the circulating crystallizer, existing one or more of the following operating conditions, wherein this step is begun when a stable evaporator operation is achieved, and the following operating conditions are maintained via the controller:
- operating condition 1: when a characteristic value of a solution in the circulation crystallizer >a predetermined threshold K, a liquid in the primary buffering device is controlled to flow to the circulation crystallizer;
- operating condition 2: when the characteristic value of the solution in the circulation crystallizer <a predetermined threshold K, the liquid in the circulation crystallizer is controlled to flow to the primary buffering device;
- operating condition 3: when the characteristic value of the solution in the circulation crystallizer >a predetermined threshold M, the liquid in the circulation crystallizer is controlled to flow to the secondary buffering device;
- operating condition 4: when the characteristic value of the solution in the circulation crystallizer <a predetermined threshold M, the liquid in the circulation crystallizer is controlled to flow to the secondary buffering device;
- S3, opening the outlet of the circulation crystallizer and generating a crystalline salt for precipitating after a condensed liquid enters the crystal filtration device and the dehydration device in sequence when the characteristic value of the solution in the circulation crystallizer reaches a predetermined crystallization threshold.

11. The waste water treatment method according to claim 10, wherein between step S1 and step S2, there is also a step of controlling a liquid in the evaporator to flow to the primary buffering device until the characteristic value of the liquid in the primary buffering device reaches a predetermined low threshold.

12. The waste water treatment method according to claim 11, wherein after operating condition 1, there is also included with a step of controlling the liquid in the evaporator to flow to the primary buffering device until the characteristic value of the liquid in the primary buffering device reaches a predetermined low threshold.

13. The waste water treatment method according to claim 11, wherein in operating condition 2, the liquid in the evaporator flows to the primary buffering device until a total liquid amount for the characteristic value of the liquid in the primary buffering device reaches a predetermined high threshold.

* * * * *